United States Patent
Hall

(10) Patent No.: US 11,192,087 B2
(45) Date of Patent: Dec. 7, 2021

(54) PRODUCT FOR OIL POLLUTION REMEDIATION

(71) Applicant: Fayetteville State University, Fayetteville, NC (US)

(72) Inventor: William T Hall, Hope Mills, NC (US)

(73) Assignee: Fayetteville State University, Fayetteville, NC (US)

( * ) Notice: Subject to any disclaimer, the term of this patent is extended or adjusted under 35 U.S.C. 154(b) by 0 days.

(21) Appl. No.: 16/582,348

(22) Filed: Sep. 25, 2019

(65) Prior Publication Data

US 2020/0016572 A1   Jan. 16, 2020

Related U.S. Application Data

(63) Continuation-in-part of application No. 15/686,772, filed on Aug. 25, 2017, now abandoned, and a continuation-in-part of application No. 15/433,589, filed on Feb. 15, 2017, now abandoned.

(60) Provisional application No. 62/381,044, filed on Aug. 30, 2016, provisional application No. 62/379,911, filed on Aug. 26, 2016.

(51) Int. Cl.

| | |
|---|---|
| *B01J 20/26* | (2006.01) |
| *C02F 1/28* | (2006.01) |
| *B01J 20/20* | (2006.01) |
| *B01J 20/28* | (2006.01) |
| *B01J 20/30* | (2006.01) |
| *B01J 20/02* | (2006.01) |
| *B01J 20/08* | (2006.01) |
| *B01J 20/10* | (2006.01) |
| *C02F 1/68* | (2006.01) |
| *C02F 101/32* | (2006.01) |

(52) U.S. Cl.
CPC ......... *B01J 20/261* (2013.01); *B01J 20/0229* (2013.01); *B01J 20/08* (2013.01); *B01J 20/10* (2013.01); *B01J 20/20* (2013.01); *B01J 20/262* (2013.01); *B01J 20/28004* (2013.01); *B01J 20/28011* (2013.01); *B01J 20/28026* (2013.01); *B01J 20/3021* (2013.01); *B01J 20/3078* (2013.01); *C02F 1/288* (2013.01); *C02F 1/681* (2013.01); *C02F 1/283* (2013.01); *C02F 1/285* (2013.01); *C02F 2101/32* (2013.01)

(58) Field of Classification Search
CPC ...... B01J 20/26; B01J 20/261; B01J 20/0229; B01J 20/08; B01J 20/10; B01J 20/20; B01J 20/262; B01J 20/28004; B01J 20/28011; B01J 20/28026; B01J 20/3021; B01J 20/3078; C02F 1/288; C02F 1/681; C02F 1/283; C02F 1/285; C02F 2101/32
USPC ....................................................... 502/402
See application file for complete search history.

(56) References Cited

U.S. PATENT DOCUMENTS

| | | | | |
|---|---|---|---|---|
| 4,165,289 | A * | 8/1979 | Borst | C02F 9/00 210/669 |
| 8,785,347 | B2 * | 7/2014 | Belisle | E02B 15/101 502/401 |
| 2011/0203996 | A1 * | 8/2011 | Monsalve | C02F 1/286 210/691 |
| 2018/0117561 | A1 * | 5/2018 | Brucato | A61L 11/00 |

* cited by examiner

*Primary Examiner* — Edward M Johnson
(74) *Attorney, Agent, or Firm* — Summa PLLC

(57) ABSTRACT

The invention is both a product and a method for the safe, harmless and effective remediation of oil spills on water and on land. The oil can then be successfully recovered from the product for use. The invention also allows for the reuse of two waste products—post consumer plastics and coal combustion product—into a material that is used for the clean-up of oil spills and for site remediation. Furthermore, the used product can be reprocessed post use into more usable product.

6 Claims, 1 Drawing Sheet

PRODUCT FOR OIL POLLUTION REMEDIATION

This application is a continuation-in-part of Ser. No. 15/433,589 filed Feb. 15, 2017, which claims priority to U.S. Provisional Patent Application No. 62/381,044 filed Aug. 30, 2016. This application is also a continuation-in-part of Ser. No. 15/686,772 filed Aug. 25, 2017, which claims priority to U.S. Provisional Patent Application No. 62/379,911 filed Aug. 26, 2016.

BACKGROUND

The invention relates to a safe, harmless and effective oil remediation product for oil spills on water and on land and method of using and making the same.

Oil spills are common events in oil transport resulting in the damaging release of liquid petroleum hydrocarbons into the environment. Because oil is often mined off shore, oil spills often occur in marine areas, producing rapid marine pollution, but oil spills may also occur on land.

Oil spills can be caused by the accidental or intentional release of any form of petroleum during any point in the oil production process, but oil spills are most often the result of accidents involving crude oil tankers, barges, pipelines, refineries, offshore platforms, drilling rigs, and storage facilities.

Marine oil spills contaminating waters can be catastrophic to marine life and fisheries and further represent immediate fire hazards. Likewise, land oil spills can contaminate surface and ground waters, including drinking water stores. Land oil spills further contaminate soils, resulting in soil largely unusable soils for agricultural purposes.

Cleanup and recovery from an oil spill on water or land is difficult and may take anywhere from several weeks to years to clean up, depending on the size of the spill, location, weather, and other variables. Oil spills are typically remediated by a variety of methods.

Oil spilled on waters tends to float because the density of oil is lower than that of the water. The density/specific gravity of pure fresh water at 4° C. is 1.0 g/cm$^3$, while the density of sea water at 25° C. is typically 1.028 g/cm$^3$.

When a spill occurs on a body of water, the spill is contained by "booms" that surround the spill. Booms are physical barriers; the hard boom is a curved piece of plastic that is anchored or tied in place to simply contain the spill; sorbent booms are made of an absorbent material, but cannot hold the oil for long and tend to leak; fire booms are made of metal and used when the oil spill is going to be burnt. In all cases, except with the fire boom, the oil must then be removed from or dissipated into the water.

Typically to remove the oil, special boats called skimmers vacuum the surface of the water for recoverable quantities of oil. If not removed, oil may be left in place allowing it to disperse naturally, but natural oil dispersion is extremely toxic to both plant and animal ecologies. Alternatively, the oil can be set on fire (in-situ burning), which typically produces air pollution. Chemical dispersants can be added to break up the oil into small particles that mix more easily with the water, but which may remain toxic.

Oil spills on land are normally contained by physically building berms around the spill for large spills, or placing sorbent rolls, called pigs around small spills. If the spill is on soil, then the soil may be dug up and taken to soil farms where the oils are allowed to dissipate over time or burned to remove the oil before being returned to the original site. If the spill occurs on a hard surface then artificial sorbent materials or saw dust are placed on the spill. The sorbents may then be swept or shoveled up and the materials disposed of as used oil waste.

Consumer plastic waste is another major source of pollution. Plastics are non-biodegradable and can take up to 1,000 years to degrade in nature.

Plastics are made from a wide variety of chemicals and primarily originate from petrochemicals. The most common plastics being polyester (PES), polyethylene terephthalate (PET), polyethylene (PE), high-density polyethylene (HDPE), polyvinyl chloride (PVC), Polyvinylidene chloride (PVDC), low-density polyethylene (LDPE), polypropylene (PP), polystyrene (PS), high-impact polystyrene (HIPS), polyamides also known as nylons (PA), acrylonitrile butadiene styrene (ABS), polycarbonate (PC) and polyurethanes (PU).

Plastic waste is often dumped in landfills, rivers, and oceans, contaminating soil, water, marine life and air. Plastic waste also clogs drainage systems and urban sewers.

In the United States alone, the average American disposes of 185 pounds of plastic annually. In the city of Los Angeles, for example, people dispose of 10 metric tons, 22,000 pounds, of plastic daily. Plastic globally accounts for 10% of all waste generated, while less than 5% of consumer plastics are recycled. Waste plastics have been found in nearly all places on earth.

Another source of pollution is coal combustion waste or coal combustion products (CCPs) from the burning of coal. CCPs are the solids collected from the furnace and the flue after coal is burned, normally for the production of electricity. CCPs can include coal ash (fly ash and bottom ash), boiler slag, and flue-gas desulphurization products. The lightweight solid form of coal ash is referred to as fly ash and heavier particles are referred to as bottom ash.

In 2007 the U.S. produced 131 million tons of CCPs, 75 million tons of which were disposed of in landfills or mixed with water in coal ash ponds. The composition of CCPs varies and is dependent upon the type of goal that was burned. Typically CCPs are primarily composed of oxides of silicon, aluminum, iron and calcium; this accounts for approximately 90%. CCPs also tend to have a variety of heavy metals and metalloids that are hazardous to human health and wildlife, including, arsenic, lead, mercury, chromium and selenium.

CCPs are not biodegradable and are often stored in large impoundments near coal-fired power plants. The heavy metals in CCPs may leach from underground impoundments or from coal ash ponds into ground and surface waters, contaminating the water.

There currently exists no method of rendering CCPs safe or alternative CCP remediation methods available other than perpetual containment.

SUMMARY

In one aspect, the invention is a new product that safely, efficiently and effectively remediates oil spills made from a mixture of waste plastics melted in oil and CCPs.

The plastics used in the product may include but are not limited to polyester (PES), polyethylene terephthalate (PET), polyethylene (PE), high-density polyethylene (HDPE), polyvinyl chloride (PVC), Polyvinylidene chloride (PVDC), low-density polyethylene (LDPE), polypropylene (PP), polystyrene (PS), high-impact polystyrene (HIPS), polyamides also known as nylons (PA), acrylonitrile butadiene styrene (ABS), polycarbonate (PC) and polyurethanes (PU). Any type of Coal Combustion Products (CCPs) can be used in the product.

In another aspect, the invention is a method of recycling post-consumer plastics and coal combustion products into a new product that safely, efficiently and effectively remediates oil spills on the surface bodies of marine and fresh water and terrestrial surfaces.

In another aspect, the invention is a method of oil pollution remediation using an oil remediation product made from consumer plastics and coal combustion products. The method includes the steps of placing the product on an oil spill for rapid oil absorption, retrieving the product with the oil entrapped in it, removing the oil from the product for reusage, and reprocessing the product for subsequent oil spill remediation.

In yet another aspect, the invention is a method of oil pollution remediation using an oil remediation product made from consumer plastics and coal combustion products. The method includes the steps of placing the product on an oil spill for rapid oil absorption, retrieving the product with the oil entrapped in it, and burning the oil-laden product as fuel to recover 100% of the oil's energy.

The foregoing and other objectives and advantages of the invention and the manner in which the same are accomplished will become clearer based on the following detailed description taken in conjunction with the accompanying drawings.

DETAILED DESCRIPTION

The product is made from recycled post-consumer plastics and coal combustion products combined to form a new product that safely, efficiently, and effectively remediates oil spills. The product involves the reuse and recycling of CCPs and plastics, and more particularly the recycling of coal ash (both fly and bottom ash) into a plasticized material.

The preferred embodiment is composed of pre and post-consumer plastics, including but not limited to polyester (PES), polyethylene terephthalate (PET), polyethylene (PE), high-density polyethylene (HDPE), polyvinyl chloride (PVC), Polyvinylidene chloride (PVDC), low-density polyethylene (LDPE), polypropylene (PP), polystyrene (PS), high-impact polystyrene (HIPS), polyamides also known as nylons (PA), acrylonitrile butadiene styrene (ABS), polycarbonate (PC), and polyurethanes (PU).

Any type of coal combustion products (CCPs) may be used, including coal ash (fly ash and bottom ash), boiler slag, and flue-gas desulphurization products.

Figure 1:
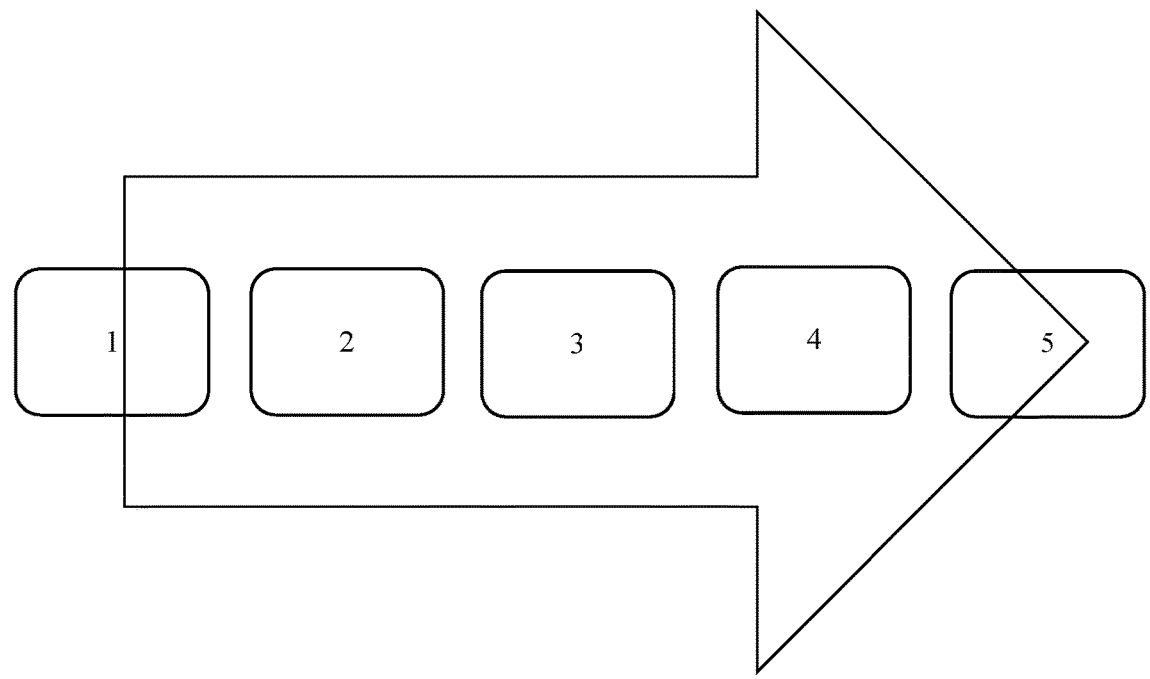
FIG. 1 represents the process of making and use of the product. Number 1 is the melting of the post-consumer plastics in a vat with oil and the subsequent addition of CCPs, followed by cooling and solidification to form the product. Number 2 represents the shredding of the product into the appropriate sizes for oil absorption. Number 3 represents the addition of the product to an oil spill and the absorption of the oil into the product. Number 4 is the recovery of the oil from the product. Number 5 is the subsequent remelting of the used product, and solidification to form new product.

Referring to FIG. 1, number 1, a petroleum or crude oil is heated until it is bubbling (at approximately 425° F.). The added oil can be petroleum or crude oil, since the initial mixture of the coal ash and plastic require a catalyst to form a uniformly distributed mixture rather than allowing the shredded plastic to burn due to the heat which will be a loss of one of the constituents of the final mixture.

Once the oil is bubbling, a quantity of solid plastics is melted with the oil at temperatures between about 165° F. and 600° F., dependent upon the types of plastics used at the time of production.

Once the solid plastics are thoroughly melted and the mixture has thickened to a paste-like viscosity, CCPs are stirred into the mixture, with the ratio of oil to plastics to CCP's at approximately 2:1:1 (oil:plastics:CCPs) or 45%-55% oil to 20%-30% plastics to 20%-30% CCP.

In the preferred embodiment, the CCP is stirred into the melted plastic in small batches until it is thoroughly and evenly mixed. The result of this being a large solid piece of the product.

Still referring to FIG. 1, number 1, the mixture is then removed from the heat and allowed to cool and solidify. This solidification may occur slowly with the natural temperature drop of the mixture to ambient temperatures, or the solidification process may be sped up by the cooling of the mixture, through the addition of water (the water will not become part of the mixture and can be reused) or by placing the mixture into a cooling or refrigerated chamber.

In an experiment of the present disclosure, the inventor successfully utilized a propane burner and container to preheat motor oil to 425° F. until bubbling, then added plastic to the hot oil to melt the plastic at a temperature of approximately 275° F. to 300° F. until the mixture reached a liquid paste. The inventor subsequently added coal ash while mixing, and evenly distributed the ash into the mixture. The container was removed from the heat, water was added to cool the mixture, and the mixture was shaved for reuse.

Once the product is solidified, it may then be mechanically shredded or pelletized into useful sizes, typically from 1 mm to 100 mm.

Particle sizes less than one millimeter after shredding of the product are too small to be used for oil spill remediation on waters because particles less than one millimeter typically disperse and sink in the water. Particles of the product less than one millimeter, however, may be used for spills on terrestrial and hard surfaces. Particle sizes greater than 500 mm×100 mm are typically too large to be used for successful oil recovery and site remediation.

In the preferred embodiment, referring to FIG. 1, number 3, the shredded product is used to absorb oils, both low density oils and high density oils. Oil spilled on waters tends to float because its density is lower than that of the water, the density/specific gravity of pure fresh water at 4° C. is 1.0 g/cm3, while the density of sea water at 25° C. is typically 1.028 g/cm3. Oils, both those termed low density and those termed high density, tend to have a density of less than 1.0 g/cm3 and thereby float on waters. The product in its shredded form has a density of less than 1.0 g/cm3 and also floats on the surface of water.

Still referring to FIG. 1, number 3, the shredded product is spread on the spilled oil, either on the water or on the ground or on a hard surface and the oil is absorbed into the product. The spill may have been contained by booms or berms, prior to the addition of the product, to prevent spread. As the oil is absorbed into the product the product coalesces and draws the oil inward and decreases the spill area as it absorbs the oil. The perimeter of the spill decreases as the oil is absorbed. Once all of the oil is absorbed into the product, the product with oil can be physically retrieved.

No matter the surface to which the invention is applied, as the oil is absorbed into the product, the product coalesces and draws the oil inward to decrease the spill area as it absorbs the oil.

Other spill containment methods incorporating booms or berms may optionally be used in conjunction with the product prior to the addition of the product, to prevent spread. As the oil is absorbed into the product the product coalesces and draws the oil inward and decreases the spill area as it absorbs the oil. The perimeter of the spill decreases as the oil is absorbed.

Once the oil is absorbed into the product, the oil-laden product may be scooped from the surface of the waters, or picked up from hard surfaces and the spilled oil recovered and reclaimed for subsequent usage. After the product has been used to remediate oil spills, it may be reprocessed into usable product and reused for subsequent spilled oil site remediation and oil reclamation.

In the preferred embodiment, referring to FIG. 1, number 4, the oil is recovered from the product for reprocessing. This recovery can be achieved mechanically; e.g., by pressing the oil filled material, or chemical means, thereby releasing the oil for recovery and reprocessing of the oil. After oil recovery is completed, the used product may be reprocessed to produce a new product.

After the product is applied to capture the spilled oil and after the oil is extracted, the product naturally retains some of the oil due to its wettability property. Therefore, the mixture can be recycled without the need for additional oil.

To reprocess the product into a freshly usable form, the used product is melted at 165 to 600° s Fahrenheit, and if needed to increase the volume more plastics and more CCPs can be added. The melting, mixing, solidification and shredding occur as described above.

Figure 2:
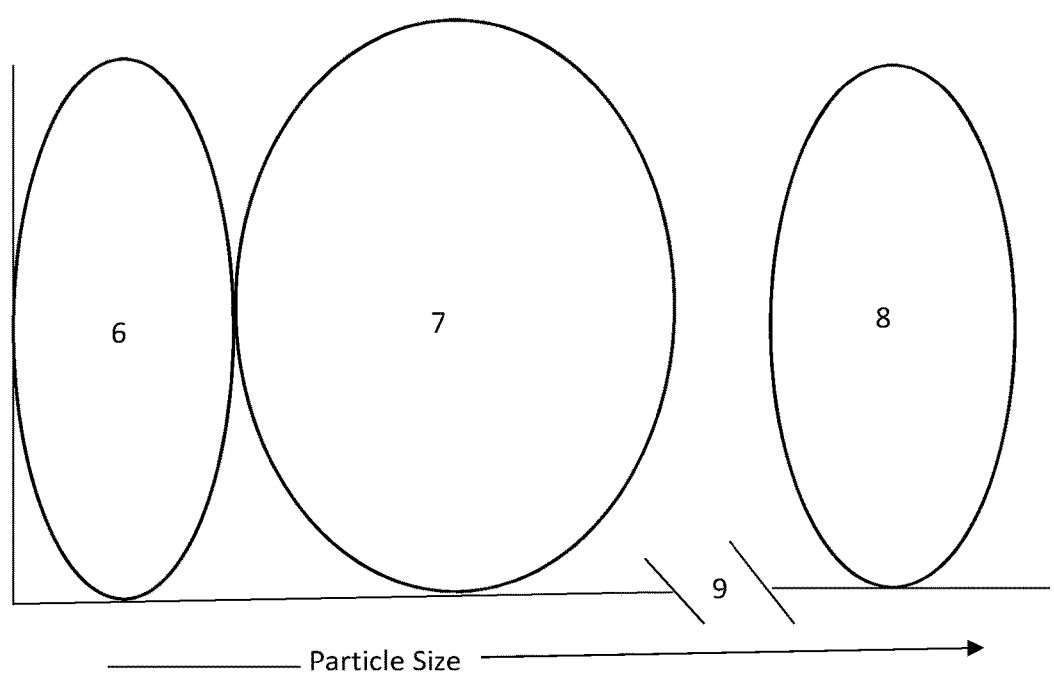
FIG. 2 schematically illustrates the particle ranges of the product that will absorb oils. The size of the particles increases from left to right. Due to the limitations of the page width, there is a discontinuum in the size scale represented by two diagonal lines and the number 9 on the figure represents a jump in the length of the size diagram. The size product particles in oval 6 are too small to be used for oil absorption and recovery in waters, but may be used for oil recovery on land. The particles sizes in oval 7 represent the optimal, but not only, usable size product particles for oil absorption and recovery on both water and land. The product size particles in oval 8 are generally too large to be used for oil absorption and recovery.

Referring to FIG. 2, oval number 6 represents the particle size after shredding of the product that is too small to be used for oil spill remediation on waters, typically less than one millimeter. Product particles smaller than this will tend to disperse in the water and may sink. However, particles of the product in oval number 6, less than one millimeter, may be used for spills on terrestrial and hard surfaces.

In the preferred embodiment, referring to FIG. 2, oval number 7 represents the optimal, although more sizes maybe used, size range of the product to be used for oil recovery and site remediation. This shredded product size range is typically between 1 and 100 millimeters.

Referring to FIG. 2, number 9 represents a discontinuum of the number/size line in the Figure. Still referring to FIG. 2, number 8 represents the size of the product that is too large to be used for successful oil recovery. This is typically greater than 500 mm, by 100 mm, although this too may occasionally be used for oil spill recovery and site remediation.

While the invention has been described with reference to an exemplary embodiment(s), it will be understood by those skilled in the art that various changes may be made and equivalents may be substituted for elements thereof without departing from the scope of the invention. Therefore, it is intended that the invention not be limited to the particular embodiment(s) but that the invention will include all embodiments falling with the scope of the specification, claims, and figures.

The invention claimed is:

1. A product for the absorption of oils comprising:
   A solidified mixture of oil, melted plastic, and coal combustion product;
   wherein said oil, plastic, and coal combustion product are present in said solidified mixture in a ratio of between 45% to 55% oil, 20% to 30% plastic, and 20% to 30% coal combustion product.

2. A product for the absorption of oils according to claim 1 wherein said plastic is selected from the group consisting of polyester, polyethylene terephthalate, polyethylene, high-density polyethylene, polyvinyl chloride, Polyvinylidene chloride, low-density polyethylene, polypropylene, polystyrene, high-impact polystyrene, polyamides also known as nylons, acrylonitrile butadiene styrene, polycarbonate and polyurethanes.

3. A product for the absorption of oils according to claim 1 wherein said coal combustion product is selected from the group consisting of coal ash, boiler slag, and flue-gas desulphurization products.

4. A product for the absorption of oils according to claim 1 wherein said product has a particle sizes of between about 1 mm and 100 mm.

5. A product for the absorption of oils according to claim 1 wherein said product has a density of less than 1.0 g/cm3.

6. A product for the absorption of oils according to claim 1 wherein said plastic is a melted and resolidified shredded plastic.

* * * * *